United States Patent Office 3,822,141
Patented July 2, 1974

3,822,141
COATED PEARLESCENT PRODUCT
Harold Kaufman, Freehold, N.J., assignor to
Whittaker Corporation
No Drawing. Filed Oct. 8, 1970, Ser. No. 79,255
Int. Cl. B44d 5/06; C09c 1/00
U.S. Cl. 117—54
1 Claim

ABSTRACT OF THE DISCLOSURE

An improved bismuth oxychloride coated pearlescent particle comprising a water-insoluble particulate silicate pretreated with an aqueous acidic solution and having co-precipitated thereon bismuth oxychloride and titanium dioxide.

BACKGROUND

Field of the Invention

The present invention is directed to pearlescent products.

Prior Art

Pearlescent pigments find extensive use in a variety of applications in the cosmetic industry, such as constituents of lipstick bases, cream bases, nail polish bases, lotions, face powder, rouges and the like. Certain pearlescent pigmented products involved a combination of an inert pearlescent or non-pearlescent base material in particulate form with a coating, usually multi-layer in nature, to enhance or to produce the pearlescent effect. The procedures by which such conventional pearlescent particles are prepared normally are relatively time consuming, meticulous and, in certain instances, expensive.

Summary of the Invention

The invention is as generally set forth in the Abstract above and includes both the product of the described method and the method itself. Optionally, the product may include titanium dioxide in minor concentration to alter the tone or hue of the pearlescent pigment. In such instance, titanium dioxide is co-deposited with the bismuth oxychloride on the particles in accordance with the present method.

The present method has application to particulate substrates such as water-insoluble silicates, including micas, asbestos, clays and silicate gels (which are water-insoluble) as well as various talcs. Such base materials are well-known to the cosmetic industry. They are inert and suitable for application to the skin.

The present method includes, as an optional step, the in situ generation of bismuth nitrate for reaction with hydrochloric acid to form in situ the desired bismuth oxychloride. Thus, bismuth nitrate can be formed, for example, by reaction of nitric acid with bismuth metal or bismuth trioxide or selected bismuth salt. Bismuth nitrate is soluble in dilute nitric acid and a species thereof, bismuth subnitrate, can be produced therefrom by reaction with water and is soluble in water and acids, including hydrochloric and nitric acids. Controlling the parameters of the present method, novel bismuth oxychloride-coated silicate particles having an improved pearlescent appearance of preselected hue can be produced easily. Further, hue changes can be made by co-precipitating titanium dioxide with the bismuth oxychloride, as previously described. The present method is simple and effective and results in a high yield of usable inexpensive product which exhibits the controlled pearlescent effect.

Detailed Description

Pretreating

The present method of making bismuth oxychloride-coated silicate particles comprises as a first important step pre-conditioning the particulate silicate by intimately contacting it with an acidic aqueous solution, particularly an aqueous solution of hydrochloric acid, for a time sufficient to effect absorption of hydrochloric acid on the surfaces thereof so that when bismuth oxychloride is deposited on the particles firm adhesion of the oxychloride to the particles will occur. For such purposes, any suitable water-insoluble silicate particles can be used. In this regard, the various forms of mica, such as biolite, phlogopite, vermiculite, synthetic micas, muscovite mica and the like can be used. Generally, muscovite mica is most satisfactory. The mica particles can be used in any suitable size. For general purpose use in the cosmetic industry, however, a size which is of the order of about 325 mesh is most suitable when mica is used. The talcs also form a preferred species of water-insoluble silicates for use in the present method. Such talcs can be used in any suitable size, for example, from about 1 to about 100 microns, with a size of about 20 to about 77 microns being preferred. The talcs generally have a composition as follows:

| | Percent by weight | |
|---|---|---|
| | General | Preferred |
| Silica | 58.00–63.00 | 58.00–62.00 |
| Calcium oxide | 0.05–6.70 | 1.40–1.70 |
| Aluminum oxide | 0.42–3.00 | 2.00–3.00 |
| Ferric oxide | 0–1.00 | 0.60–1.00 |
| Magnesium oxide | 30.00–34.00 | 30.00–31.00 |

It will be understood that other talcs having slightly different compositions can also be used in accordance with the present method and that for the purposes of the present invention, they are classified as silicates. Aluminum silicate clays such as kaolinite, montmorillonite, attapulgite and the like can be used, so long as they are water insoluble and of suitable particle size. So also can the water-insoluble silicate gels and various types of asbestos fibers, particles and the like.

In accordance with the first major step of the present method, the water-insoluble particulate silicate is intimately contacted, as by agitating the same, with an aqueous solution of hydrochloric acid of any suitable strength. For example, 65 grams of talc can be dispersed in 1 gallon of water containing 24 grams of 20° Baume hydrochloric acid for any suitable length of time, for example, ten minutes under mechanical agitation such that the hydrochloric acid is adsorbed on the surfaces of the particulate talc.

This step is necessary in order to assure that the bismuth oxychloride generated and deposited in a subsequent step in accordance with the present method will adhere strongly to the surfaces of the particulate silicate to form a unitary product therewith.

The aqueous hydrochloric acid solution in which the particulate silicate is contacted may be at any suitable temperature, preferably at an elevated temperature of, for example 190° F., although the reaction and the desired adsorption can occur in a temperature range of up to about the boiling point of the solution e.g. about 212° F. At about 190° F. the contact time may be, for example, about ten minutes to achieve the desired results. The particular desired concentration of hydrochloric acid in aqueous solution and the contact time necessary to impart the required conditioning to the particulate silicate will depend upon the total surface area of the silicate, the extent to which the silicate is dispersed in the solution, the temperature of the solution and related factors. Generally however, the number of grams of hydrochloric acid in, for example, 1 gallon of aqueous solution utilized for the pretreatment step will usually be about 15 grams (20° Baumé) and the number of grams of silicate particles contacted in said solution of 1 gallon volume will generally be between about 10 and about 100 grams. Usually, a relatively high temperature below the boiling point of the solution will be employed to minimize the contact time to approximately ten minutes or less. Usually also, vigorous agitation as by mechanical stirring or the like is employed to maximize effective contact and assure uniform pretreatment of the particles with the aqueous hydrochloric acid solution.

In situ generation of bismuth oxychloride

As a further step of the present method, bismuth oxychloride is generated in situ in an aqueous medium containing the pretreated silicate particles dispersed therein. Preferably, the pretreated particles are contacted with an aqueous solution containing hydrochloric acid and bismuth nitrate dissolved in the solution. Such solution may further contain nitric acid, if desired. The contacting is effected for a time sufficient to cause the in situ generation of bismuth oxychloride and its deposition as a solid adherent coating on the particles of silicate dispersed in the solution. The particles are maintained preferably in active movement, i.e. under vigorous agitation as by manual or mechanical agitation, so as to maximize the uniform coating of the particles and reduce the treatment time.

For the thus-described main treating step, the hydrochloric acid in aqueous solution can be provided in any suitable concentration which is sufficient to adequately react with the bismuth nitrate present in dissolved form in the solution to provide sufficient bismuth oxychloride for the intended purpose of coating the silicate particles suspended or dispersed in the solution. It has been found that, for example, the same aqueous hydrochloric acid solution which is usually employed in the pretreating step above-described can be further employed in the treating step so long as it has added to it after the pretretament the requisite amount of bismuth nitrate or has bismuth nitrate generated therein in situ as hereinafter more fully explained.

For example, if nitric acid is also present in the aqueous solution in a sufficient amount, then a compound which reacts with the nitric acid to provide bismuth nitrate in solution can be employed rather than bismuth nitrate itself. Thus, bismuth trioxide, $Bi_2O_3$, which is soluble in acids and insoluble in water can be converted to bismuth nitrate by reaction with the nitric acid. As another example, bismuth metal, soluble in hydrochloric acid containing nitric acid reacts with the latter to form bismuth nitrate. Many other bismuth-containing materials, i.e. any other bismuth salt which reacts with nitric acid to form bismuth nitrate can be used to provide the bismuth in solution, either directly in the treating solution itself or in a separate reaction zone from which the resulting product bismuth nitrate can be provided to the treating solution.

The bismuth nitrate referred to above can be either $Bi(NO_3)_3 \cdot 5H_2O$, which is mainly soluble in dilute nitric acid, or its derivative bismuth sub-nitrate, that is

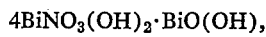
$4BiNO_3(OH)_2 \cdot BiO(OH)$, which is soluble in acids in general, including hydrochloric acid and which is derived by reaction of the bismuth nitrate, above-described, with water over a short period of time. Accordingly, if bismuth nitrate per se rather than its derivative form bismuth sub-nitrate, is used in the system then nitric acid should be present to help solubilize the same and increase the rate of reaction of hydrochloric acid with bismuth nitrate to provide the bismuth oxychloride. It will be further understood that when bismuth nitrate is hereinafter referred to herein, either or both of the forms of bismuth nitrate above-described (including the sub-nitrate) are contemplated. The reaction between bismuth nitrate and hydrochloric acid present in the solution produces in situ bismuth oxychloride having the formula BiOCl and which is a gray to white crystalline powder exhibiting lustre and which is insoluble in water. This insolubility is such that as the bismuth oxychloride is formed it precipitates out or plates out as a crystalline coating on the pretreated particles of silicate suspended in the solution. The resultant bismuth oxychloride coating entirely covers and strongly adheres to the surfaces of the silicate particles due to the preconditioning of such surfaces via the pretreating step previously described. Although the present invention is not limited thereto it is believed that the formation of the bismuth oxychloride is by a two-stage reaction which initially involves the reaction of bismuth nitrate with hydrochloric acid to form bismuth chloride and the further reaction of the thus-formed bismuth chloride with water to form the bismuth oxychloride. In any event, production of bismuth oxychloride coating on the particles is demonstrable.

As an alternative procedure for the in situ generation of bismuth oxychloride and plating out in the aqueous medium on to the surfaces of the pretreated silicate particles, bismuth chloride can be disposed in the aqueous medium containing the pretreated silicate particles. Bismuth chloride reacts with water to in situ generate the bismuth oxychloride which then plates out on the particles, as previously described.

The treating step, regardless of the particular technique for in situ generation and deposition of bismuth oxychloride, can take place at from about room temperature to about boiling point of the solution i.e. about 212° F., but preferably should be conducted at about 190° F., as in the pretreating step, to maximize the rate of generation and deposition of the bismuth oxychloride. The weight ratio of the bismuth oxychloride to the silicate particles present during the treating step may vary so that the amount of bismuth oxychloride in the combined bismuth oxychloride silicated finished particles may be from about 10% to about 90% the weight of the finished coated particles. The contact time for this step may be any suitable time, for example, ten to thirty minutes or more, at any suitable temperature, as indicated above. Preferably, the concentration of hydrochloric acid in the aqueous medium in this step, if the preferred procedure is employed, is sufficient to maintain throughout the reaction period and thereafter an acidic environment in which the bismuth oxychloride precipitates out on the surface of the silicate particles to thoroughly coat the same. Preferably, agitation is maintained throughout the in situ generation and deposition to facilitate rapid completion of the step with uniform coating of the particles.

The thus-coated particles can then be separated from the treating solution by any suitable means, for example, as by draining off the treating solution and preferably are purified, as by washing the particles until the wash water exhibits a neutral pH (7.0 pH). The thus-coated particles can then be dried by any suitable means, as by air drying, drum drying, tray drying or the like and then are ready for use.

It will be noted that the particular appearance of the coated particles depends upon the particular silicate substrate utilized, the average size of the individual particles and the reaction parameters so that some differences in appearance can be provided. However, the appearance of the particles in any event is pearlescent. Thus, for example, pearlescent pigment can be prepared which can range from a bright creamy white pearl color to a bright gray metallic pearl color. Such pigment is completely acceptable for cosmetic use. In this regard, various lipstick compositions advantageously incorporate this pigment, as do beauty creams, face powders, rouge and the like. So-called press powders, powders used in aerosol sprays, deodorant sprays and the like all can employ the improved pearlescent pigment. The effects achieved by the pigment are unique and decorative.

As an optional part but preferred in the present invention, the present method can be modified by the addition in the step involving in situ generation and deposition of the bismuth oxychloride, of a small concentration of titanium dioxide hydrate, that is, the water soluble form of titanium dioxide, to the treating solution so that co-precipitation of titanium dioxide with the bismuth oxychloride occur on the silicate particles. The nacreous pigment obtained by such co-precipitation is whiter in appearance with a metallic reflectance and thus affords a further distinctive and attractive cosmetic effect. Any suitable concentration of the titanium dioxide hydrate can be used in the treating solution. However, it has been found that only a small percentage of titanium dioxide in the coating deposited on the silicate particles is necessary to impart the distinctive white color with metallic reflectance. Accordingly, it is preferred that the final concentration of the titanium dioxide in the coating on the particles be of the order of, for example, about 1% to about 5% of the total coating. As an example, in the treating step, per gallon of treating solution a concentration of, for example, about 0.5–5 grams of 27% water solution of hydrated titanium dioxide can be used advantageously. Such a reagent can be thoroughly dispersed within the treating solution. The parameters for the treating steps otherwise can be the same as previously indicated. Preferably, however, the temperature of the treating solution is kept above about 150° F. to speed the reaction and maximize the beneficial results.

The finished products comprise novel lustrous pearlescent particles having a water-insoluble substrate enclosed in a solid coating of bismuth oxychloride (with or without titanium dioxide) tightly bonded to the surfaces of the silicate. It will be understood that additional components may be included in or on the coating and/or substrate, if desired. It will be further understood that the finished bismuth oxychloride-coated pearlescent particles may optionally contain disposed on the oxychloride surfaces thereof certain other materials which tend to improve the dispersability of the coated particles in various vehicles. In this regard, the finished particles can be coated with solutions, dispersions, liquids or powders of conventional known dispersants such as glycols, polyglycols, carboxy cellulosic polymers, carboxy vinyl polymers, lecithin, modified lecithins and the like. Other agents useful in dispersing pigments for cosmetic and other uses can also be employed.

It will be further understood that all of the ingredients specified for the present method above-described can be of any suitable quality and are commercially available. Preferably in certain instances reagent grade chemicals are employed. Further features of the present invention will be apparent from a study of the following specific Examples:

Example I

To 1 gallon of water at 190° F. was added 65 grams of 325 mesh water-ground muscovite mica under vigorous agitation. Once the mica had been thoroughly dispersed, 24 grams of hydrochloric acid, 20° Baume, were added. This was allowed to agitate for 10 minutes so that the hydrochloric acid could be absorbed on to the surface of the mica. This was done so that the adhesion of the bismuth oxychloride to the mica could be improved. Once this was accomplished, the following solution was slowly introduced while the suspension of mica in hydrochloric acid solution was agitated:

| | Gms. |
|---|---|
| Bismuth nitrate, pentahydrate | 90 |
| Hydrochloric acid, 20° Baumé | 72 |
| Water | 10 |

After the addition of the above solution, precipitation of bismuth oxychloride pearl occurred. This mixture was allowed to agitate for 30 minutes in order to set the crystals of bismuth oxychloride to the surface of the mica. The product was then washed repeatedly with water until a pH of 7 was achieved, and then the product was dried. The finished product had a bright gray metallic pearlescent appearance. An identical test using talc in place of the mica yielded comparable results.

Example II

The same procedure was employed as in Example I, but using 160 mesh water-ground muscovite mica in place of 325 mesh mica.

The product comprised large flakes having a bright gray metallic pearlescent appearance.

Example III

The same procedure was employed as in Example I, but using Micro mesh water-ground muscovite mica. The product was a fine powder having a gray metallic pearlescent appearance.

Example IV

To 1 gallon of water at 190° F., was added 65 grams of 325 mesh water-ground muscovite mica under vigorous agitation. Once the mica had been thoroughly dispersed, 15 grams of hydrochloric acid 20° Baumé, was added. This was allowed to agitate for 10 minutes so that the hydrochloric acid could be adsorbed onto the surface of the mica. This was done so that the adhesion of the bismuth oxychloride to the mica could be improved.

Once this was accomplished, the following solution was slowly introduced while the suspension of mica in hydrochloric acid solution was agitated:

| | Gms. |
|---|---|
| Bismuth nitrate, pentahydrate | 90 |
| Nitric acid, 42° Baumé | 40 |
| Water | 60 |
| Hydrochloric acid, 20° Baumé | 45 |

After the addition of the above solution, precipitation of bismuth oxychloride pearl took place. This mixture was allowed to agitate for 30 minutes in order to set the crystals of bismuth oxychloride to the surface of the mica. The product was then washed repeatedly until a pH of 7 was achieved, and then the product was dried.

The product was intermediate in appearance between a bright creamy white pearlescent pigment and a bright gray metallic pearlescent pigment. When a parallel test was run substituting talc for the mica, comparable results were obtained. In parallel tests, bismuth metal and bismuth trioxide were substituted for the bismuth nitrate. Bismuth nitrate was generated in situ in the nitric acid-containing reaction medium with results comparable to the first-described test.

Example V

To 1 gallon of water at 190° F. was added 65 grams of 325 mesh water-ground muscovite mica under vigorous agitation. Once the mica had been thoroughly dispersed, 60 grams of hydrochloric acid, 20° Baumé, was added. This was allowed to agitate for 10 minutes so that the hydrochloric acid could be adsorbed on to the surface of the mica.

Once this was accomplished, the following solution was slowly introduced while the suspension of mica in hydrochloric acid solution was agitated:

| | Gms. |
|---|---|
| Bismuth nitrate, pentahydrate | 90 |
| Nitric acid 42° Baumé | 40 |
| Water | 60 |

After the addition of the above solution, precipitation of bismuth oxychloride pearl took place. This mixture was allowed to agitate for 30 minutes in order to set the crystals of bismuth oxychloride to the surface of the mica. The product was then washed repeatedly with water until a pH of 7 was achieved, and then the product was dried.

The product had a bright creamy white pearlescent appearance. In parallel tests, bismuth metal and bismuth trioxide were substituted for the bismuth nitrate. Bismuth nitrate was generated in situ in the nitric acid-containing reaction medium with results comparable to the first described test. Comparable results were also obtained substituting talc for the mica. Additional tests showed silica gel, clay and asbestos to be approximately equivalent, but with some color and hue variations in the pearlescent products.

Example VI

A solution as follows was placed in an empty reactor:

| | Gms. |
|---|---|
| Bismuth nitrate pentahydrate | 90 |
| Hydrochloric acid, 20° Baumé | 180 |
| Water | 200 |

The agitator was set such that it was immersed in the solution and agitation was started. Under agitation, 65 grams of 325 mesh water-ground muscovite mica was added, and allowed to thoroughly mix for 10 minutes. Cold water was then added, under agitation until dilution was sufficient to cause precipitation of the bismuth oxychloride pearl; 1 gallon of water was added.

The solution was then allowed to mix for 30 minutes in order to set the crystals of bismuth oxychloride to the surface of the mica.

The product was then repeatedly washed with water until a pH of 7 was achieved and the product was then dried.

The product had a bright creamy white pearlescent appearance, though not as bright as that prepared from hot water. Comparable results were obtained when talc was substituted for the mica. Equivalent results are also obtainable with asbestos, clay and silica gel.

Example VII

Example I was repeated but adding 1 gm. of a 27% water solution hydrated titanium dioxide to the treating solution. This product was much whiter than the product from Example I, but with the same basic pearlescent characteristics. Additional tests using larger and smaller amounts of hydrated titanium dioxide (0.5 gms., 1.2 gms. and 3 gms.) yielded comparable results.

Example VIII

Example IV was repeated, but adding 1 gram of 27% water solution of hydrated titanium dioxide. The product was much whiter than the product from Example IV, with the same basic pearlescent characteristics.

Example IX

Example V was repeated, but adding 1 gram of a 27% solution of hydrated titanium dioxide. The product was much whiter than the product from Example V with the same basic pearlescent characteristics.

Example X

Example VI was repeated, but adding 1 gram of a 27% solution of hydrated titanium dioxide. The product was much whiter than the product of Example VI with the same basic pearlescent characteristics. Further tests were run utilizing various other concentration of hydrochloric acid, nitric acid and silicate particles and various operating temperatures. All such tests were performed successfully.

Example XI

It has also been determined that maximum efficiency as to dispersibility in the various vehicles of end use can be achieved by coating the final product with any suitable materials such as the glycols, the polyglycols, the carboxyl cellulosic polymers, the carboxyl vinyl polymers, lecithin and modified lecithins and others known to those skilled in the art. Concentrations of from about 0.5 to about 5% by weight or more of the described dispersants produced effective results. In order to evaluate these products, the following cosmetic materials were prepared:

LIPSTICK BASE

| | Gms. |
|---|---|
| Carnauba wax | 10 |
| Ozokerite wax | 12 |
| Candellila wax | 20 |
| Beeswax | 28 |
| Castor Oil U.S.P. | 130 |

CREAM BASE

| | Gms. |
|---|---|
| Stearic Acid xxx | 10 |
| Glyceryl Monostearate | 16 |
| Triethanolamine | 2 |
| Propylene glycol | 22 |
| Water | 150 |

NAIL POLISH BASE

| | Gms. |
|---|---|
| R.S. ½ sec. nitrocellulose solution (37%) | 56 |
| Butyl Acetate | 22 |
| Ethyl Acetate | 22 |
| Camphor | 5 |
| Dibutyl Phthalate | 5 |
| Santolite M H P (Monsanto Chemical Co.) | 20 |
| Toluol | 64 |
| Ethyl Alcohol | 3 |

The pearlescent pigments prepared were formed into pearlescent dispersions by mixing with castor oil, 40% pigment and 60% castor oil, by standard procedures well known to those skilled in the art, as well as being prepared as dry pearlescent powders. These were all evaluated in the foregoing cosmetic formulations to determine applicability and versatility.

Lipsticks were prepared as follows:

| | Percent |
|---|---|
| 1. Castor oil pearlescent dispersion | 33⅓ |
| Lipstick Base | 66⅔ |
| 2. Dry pearlescent powder | 14 |
| Lipstick Base | 86 |

Both the castor oil dispersions and the dry pearlescent pigments were found to disperse well and gave an excellent pearlescent effect.

A lotion was prepared as follows:

| | Percent |
|---|---|
| Dry pearlescent powder | 30 |
| Cream Base | 70 |

The pearlescent pigments were found to disperse well and gave an excellent pearlescent effect.

A nail polish was prepared as follows: 35 gms. of pearlescent powder was dispersed in 65 gms. of nitrocellulose solution consisting of 20% R.S. ½ sec. nitrocellulose and 80% butyl acetate. 4 gms. of this nitrocellulose pearlescent solution was thoroughly mixed with 40 gms. of nail polish base.

The pearlescent pigments were found to be thoroughly dispersed and of excellent pearlescent character.

A basic face powder blend was prepared as follows:

| | Percent |
|---|---|
| Dry pearlescent pigment | 70 |
| Alabama talc | 30 |

After thoroughly blending the two dry powders, it was found that the blend had an excellent pearlescent character.

Conclusion

Accordingly, from the foregoing Examples and detailed description, it is apparent that an improved particulate silicate product containing a firmly adherent solid surface coating comprising bismuth oxychloride (with or without optional concentrations of titanium dioxide) and a substrate of silicate, can be provided by the present simple, inexpensive and rapid method. Such method includes a pretreating step to condition the surface of the silicate particles to assure tight bonding between the coating and the silicate surfaces, and a treating step to in situ generate and deposit or codeposit (in the case where titanium dioxide is present in the treating solution) of the desired adherent pearlescent bismuth oxychloride-containing coating. Once such coating has been applied, the finished particles can be washed free of impurities, dried and (optionally) coated with dispersing agents or the like and are then ready for use as lustrous pearlescent pigments in cosmetic formulas, including those for lipstick, face cream, nail polishes, rouges and various other compositions. It is preferred to utilize mica and/or talc as the silicate particles, although various other silicate substrates which are water-insoluble can also be effectively employed.

Accordingly, a novel method and product having improved utility are provided. Further advantages of the present method and product are as set forth in the foregoing.

Various modifications, changes, alterations and substitutions in the present method, its steps and parameters and in the present product and its ingredients can be made. All such modifications, changes, alterations and substitutions which are within the scope of the appended claim form part of the present invention.

What is claimed is:

1. An improved pearlescent particle comprising a pretreated substrate of water-insoluble silicate, having hydrochloric acid-contacted surfaces, and a strongly adherent surface coating comprising co-precipitated bismuth oxychloride and about 1-5 percent of titanium dioxide by weight of the total coating, enclosing said substrate.

References Cited
UNITED STATES PATENTS

| | | | |
|---|---|---|---|
| 2,974,053 | 3/1961 | Suchow | 106—291 X |
| 2,973,282 | 2/1961 | Gross | 117—123 X |
| 3,123,490 | 3/1964 | Bolomey et al. | 106—291 |
| 2,019,852 | 11/1935 | Harrap | 117—126 |
| 3,597,250 | 8/1971 | Rands et al. | 106—291 |
| 3,632,527 | 1/1972 | Alpert et al. | 117—100 X |
| 3,331,699 | 7/1967 | Marshal et al. | 117—100 X |

FOREIGN PATENTS

| | | | |
|---|---|---|---|
| 1,281,901 | 10/1968 | West Germany | 117—100 |
| 694,861 | 5/1930 | France | 117—159 |
| 735,874 | 4/1932 | France | 117—159 |
| 231,030 | 7/1909 | Germany | 117—159 |

WILLIAM D. MARTIN, Primary Examiner

S. L. CHILDS, Assistant Examiner

U.S. Cl. X.R.

106—291; 117—100 S, 123 A, 159